United States Patent [19]

Gunnarsson et al.

[11] Patent Number: 4,563,342
[45] Date of Patent: Jan. 7, 1986

[54] METHOD FOR PRODUCING BASIC ALUMINUM SULPHATE (III)

[75] Inventors: Lennart K. Gunnarsson, Helsingborg; Rolf O. Nilsson, Mölle, both of Sweden

[73] Assignee: Boliden Aktibolag, Stockholm, Sweden

[21] Appl. No.: 541,016

[22] Filed: Oct. 12, 1983

[30] Foreign Application Priority Data

Nov. 2, 1982 [SE] Sweden ................ 8206207

[51] Int. Cl.⁴ .................. C01F 7/74; C01F 7/02
[52] U.S. Cl. .................. 423/556; 210/705; 423/626; 423/629
[58] Field of Search ............ 423/128, 199, 626, 629, 423/556, 551

[56] References Cited

U.S. PATENT DOCUMENTS

| | | | |
|---|---|---|---|
| 1,986,091 | 1/1935 | Wood | 423/128 |
| 2,648,595 | 8/1953 | Kennedy | 423/128 |
| 2,657,115 | 10/1953 | Ashley | 423/629 |
| 3,440,008 | 4/1969 | Bonelli | 423/556 |
| 3,544,476 | 12/1970 | Aiba et al. | 423/556 |
| 3,655,329 | 4/1972 | Shih et al. | 424/157 |
| 3,798,160 | 3/1974 | Huffman | 423/629 |
| 3,929,666 | 12/1975 | Aiba et al. | 423/556 |
| 4,238,347 | 12/1980 | Gancy | 423/629 |
| 4,265,863 | 5/1981 | Wajc | 423/128 |
| 4,332,778 | 6/1982 | Hobday | 423/556 |

FOREIGN PATENT DOCUMENTS

| | | | |
|---|---|---|---|
| 5419 | 11/1979 | European Pat. Off. | |
| 17634 | 10/1980 | European Pat. Off. | |
| 45-49 | 1/1970 | Japan | 423/556 |
| 56-12251 | 3/1981 | Japan | 423/419 P |
| 8104149 | 7/1981 | Sweden | |
| 419212 | 7/1981 | Sweden | |

*Primary Examiner*—Gary P. Straub
*Attorney, Agent, or Firm*—Brumbaugh, Graves, Donohue & Raymond

[57] ABSTRACT

The present invention relates to a method for producing sulphate-poor, polynucleate aluminium hydroxide sulphate complexes of the general formula $$[Al(OH)_x(SO_4)_y(H_2O)_z]_n$$

in which n is an integer; x is 0.75–2.0; y is 0.5–1.12; x+2y is 3; z is 1.5–4 when the product is in solid form, and z>>4 when the product is in the form of an aqueous solution, an amorphous aluminium hydroxide being admixed with aluminium sulphate and/or sulphuric acid to y=0.5–1.12; preferably 0.5–0.75.

7 Claims, No Drawings

METHOD FOR PRODUCING BASIC ALUMINUM SULPHATE (III)

DESCRIPTION

1. Technical Field

The present invention relates to a method for producing polynucleate basic aluminium sulphate which gives in aqueous solution positively charged polynucleate complexes having charge-neutralizing properties in systems containing suspended or colloidal, negatively charged particles.

The object of the present invention is to provide a rational method for the industrial production of polynucleate basic aluminium sulphate.

2. Background Art

A number of aluminium products which contain polynucleate aluminium ions in solution are known to the art. These products are the result of a requirement for more effective chemicals in, for example, the fields of water purification, paper sizing, and plant de-watering. When used in these particular fields, the polynucleate products exhibit far superior qualities than do previously used simple compounds, due to the higher charge of the metal ions. In principle, two different kinds of aluminium products have been developed with the aim of improved efficiency in the aforesaid context; these products being firstly chloride-based basic aluminium compounds and secondly sulphate-based aluminium compounds. Of the first mentioned group there was developed first a polyaluminium chloride (PAC) of the general formula $$[AlCl_x(OH)_{3-x}]_n$$

where x is <3, normally 1-2.

These compounds and methods for their manufacture have been described in, for example, SE,B,7,201 333-7, SE,B,7 405 237-4, SE,B,7 412 965-1, SE,B,7 503 641-8 and DE,A,2 630 768.

The other kind of aluminium chloride solutions, PALC, which are also based on a context of the same polynucleate complexes, have general summary formuli which can be written thus:

$$[AlCl_3 \cdot xAOH]_n$$

where A is alkali metal, and $$[AlCl_3 \cdot (x/2)B(OH)_2]_n$$

where B is an alkali earth metal, n is a positive integer, and x is a value within the range of 1-2.7.

Polynucleate aluminium-chloride solutions of the PALC-type are found described in FR,A1, 7 512 975, according to which the solutions are produced by alkalizing aluminium-chloride solutions with solutions of alkali hydroxide. According to this publication, however, it has not been possible to produce clear, stable solutions other than in a highly diluted state. By "stable solution" is meant here and in the following a solution which does not change with respect to composition and properties, not even when stored for extended period of time. Thus, it is stated in the publication that under certain conditions, it is possible to obtain a solution with up to 0.40 moles of aluminium per liter. The stability of this solution, however, is greatly limited, and it is necessary to inject the solution directly into the water to be purified. It is clearly evident from the publication, and in particular from the working examples, that solutions having aluminium concentrations in excess of about 0.1 mole per liter cannot be expected to be effective and stable in the PALC-solutions known according to the publication.

Sulphate-based basic aluminium compounds are found described in EP,A, 79850039-3; EP,A, 80850033-4 and SE,A, 8101830-1.

These products have to a greater or lesser extent polynucleate metal-ions in solution, and are therefore effective water-purifying substances. The sulphate-based products can also be used for purposes other than for purifying water, where the presence of the polynucleate metal ions favours the achievement of desired effects.

In certain cases, however, it is desirable, and at times even necessary, to restrict the supply of sulphate ions to the greatest possible extent with applications made in the aforementioned fields, particularly when purifying drinking water. This is particularly important in systems which are repeatedly used and cleansed in order to eliminate the risk of the accumulation of sulphate in tissues, and in water from the aspect of concrete corrosion. This, therefore, applies to certain water-purifying systems where there is a lack of water, rendering it necessary to use the water for as long as possible, with intermediate water-purifications. After having been cleansed ten times with conventional aluminium sulphate or compositions having corresponding sulphate contents (FALS), the sulphate content of such water is so high that the water will attack the water-piping system resulting in troublesome leakages. The problem of sulphate-ion enrichment has now also manifested itself in the papermaking industry, in which for environmental reasons the water system is closed to a large extent. Excessively high percentages of salts in the paper stock seriously disturb the manufacturing processes.

In U.S. Pat. No. 4,238,347 there is proposed a method for producing a basic aluminium sulphate which is poor in sulphate and which has the formula $$Al(OH)_x(SO_4)_y(H_2PO_4)_z(H_2O))_w$$

where
x is 0.75-1.5;
y is 0.7-1.07;
z is 0-0.2; and
w is 2.0-4.2,
x+2y+z being equal to 3.

The compounds are produced by reacting aluminium sulphate with ground calcium carbonate, optionally in the presence of phosphoric acid, and by filtering the reaction mixture to separate the gypsum formed. It has been found, however, that the carbon dioxide departing from the reaction with the calcium carbonate, together with the gypsum, creates enormous problems with respect to process techniques, due to the foam formed, which, especially with high aluminium-sulphate concentrations, cannot be broken up. It is even impossible to break up effectively the foam when foam inhibitors are present. In fact, the use of foam inhibitors should be avoided, since they act as a contaminant in the different uses to which the aluminium sulphate is put. The calcium carbonate also reduces the stability of the product.

In SE,A, 8104149-3 there is described an improved method for producing sulphate-poor polynucleate aluminium hydroxide complexes of the formula $$[Al(OH)_x(SO_4)_y(H_2O)_z]_n$$

where
n is an integer
x is 0.75–2.0;
y is 0.5–1.12;
x+2y is 3 and
z is 1.5–4, z being $\leq 4$ when the product is in solid form and z being $>>4$ when the product is in solution,
the aluminium sulphate being admixed with one or more of the compounds from the group CaO, Ca(OH)$_2$, BaO, Ba(OH)$_2$, SrO, Sr(OH)$_2$ in aqueous solution to the reaction to form the given compound, whereafter the resultant alkali earth metal sulphate precipitate is separated out and the residual solution optionally vapourised. The resultant solution, which can be obtained with a high basicity, OH/Al$\leq$2.0, has splendid properties, but the manufacture of the solution results in a water, the alkali earth metal sulphate, which is undesirable, since it constitutes up to 30% of the reaction mixture at a basicity of 2.0. A search has therefore been made for other methods which give no waste or which yield a residual product which has its own market value.

BRIEF DESCRIPTION OF THE INVENTION

It has now been found possible to eliminate these technical problems and to provide in a rational and simple manner a sulphate-poor, basic aluminium sulphate of the general formula $$[Al(OH)_x(SO_4)_y(H_2O)_z]_n$$

where
n is an integer
x is 0.75–2.0, preferably 1.5–2.0
y is 0.5–1.12, preferably 0.5–0.75
x+2y is 3
z is 1.5–4, when the product is in solid form and
z is $>>4$, when the product is in the form of an aqueous solution,
the invention being characterised in that a solution of an aluminium salt is neutralised to pH 5–7 for precipitating amorphous aluminium hydroxide, which is separated out and then admixed with sulphate ions in the form of aluminium sulphate and/or sulphuric acid to a y-value of 0.5–1.12, preferably 0.5–0.75, this product optionally being converted to a solid product.

Further characteristic features of the invention are set forth in the accompanying claims.

Particularly preferred compounds are those in which x is 1.6–1.8. y is 0.6–0.7; and in solid form, in which case z is 2.0–2.5.

The compound exists in the form of a polynucleate complex in aqueous solution and it should also exist in the same form in the solid product.

THE BEST MODE OF CARRYING OUT THE INVENTION

The compound according to the invention can be produced in accordance with the following:

Amorphous aluminium-hydroxide is produced by neutralising an aluminium salt, particularly aluminium sulphate, aluminium chloride, aluminium nitrate or sodium aluminate, to pH 5–7. In this respect, a solution of aluminium sulphate, aluminium chloride or aluminium nitrate, which is acidic, is admixed with hydroxyl-ions, in the form of sodium hydroxide, potassium hydroxide, for example, to obtain the aforesaid pH, whereupon amorphous aluminium hydroxide is precipitated, this precipitate being isolated, for example, by filtering to form a filter cake, which can attain a substance content of about 20% (5–6% Al) and about 80% H$_2$O. The yield with respect to aluminium is about 100%. A solution of sodium aluminate, NaAlO$_2$, which is alkaline, is admixed with hydrogen ions, in the form of sulphuric acid, hydrochloric acid or nitric acid, for example, to obtain the aforesaid pH, whereupon amorphous aluminium hydroxide is precipitated, the precipitate being isolated in the aforesaid manner. The yield is 100%.

When producing the aforesaid compound from aluminium sulphate and sulphuric acid a certain amount of the sulphate will be found in the aluminium hydroxide, bound to the surfaces thereof.

EXAMPLE 1

An aluminium hydroxide produced by neutralising aluminium sulphate with sodium hydroxide and filtering to attain an aluminium content of 4.2 grams was admixed with 93 grams of aluminium sulphate having a total aluminium content of 8.4 grams, and was heated to 80° C. for 30 minutes. In this way there was obtained a clear solution of a sulphate-poor, polynucleate aluminium hydroxide sulphate complex containing 4.9% Al; 19.0% SO$_4$; OH/Al=0.8; $\rho$=1.29 kg/dm$^3$.

EXAMPLE 2–3

Solutions having the following data were prepared in accordance with Example 1 above.

| | Starting Materials | | | | End Product | | | |
|---|---|---|---|---|---|---|---|---|
| Ex | Filter cake g | g Al | Aluminium g | sulphate g Al | Al % | SO$_4$ % | OH/Al | $\rho$ kg/dm$^3$ |
| 2 | 103 | 6.3 | 70 | 6.3 | 4.8 | 15.6 | 1.2 | 1.25 |
| 3 | 138 | 8.4 | 47 | 4.2 | 4.6 | 11.7 | 1.6 | 1.20 |

EXAMPLES 4–6

Solutions were prepared in accordance with Example 1, with the exception that sodium aluminate and sulphuric acid were the starting materials.

| | Starting Materials | | | | End Product | | | |
|---|---|---|---|---|---|---|---|---|
| Ex | Filter cake g | g Al | Aluminium g | sulphate g Al | Al % | SO$_4$ % | OH/Al | $\rho$ kg/dm$^3$ |
| 4 | 76 | 4.0 | 93 | 8.4 | 5.0 | 19.3 | 0.8 | 1.30 |
| 5 | 121 | 6.3 | 70 | 6.3 | 5.0 | 15.8 | 1.2 | 1.26 |
| 6 | 162 | 8.3 | 47 | 4.2 | 4.6 | 12.6 | 1.5 | 1.22 |

EXAMPLE 7

Amorphous aluminium hydroxide was prepared in accordance with Example 1 above. An aluminium sulphate solution containing 0.17 mole sodium citrate per mole aluminium was added to the amorphous aluminium hydroxide. The resultant sulphate-poor, polynucleate aluminium hydroxide sulphate complex solution was stable for at least four month at room temperature, without any tendency of aluminium hydroxide precipitating.

The solution is unstable when stored, and the aluminium compound present decomposes to form insoluble aluminium salts. The solution can be stabilised, however, by adding thereto, 1.0–2.0% sodium heptonate.

Other suitable stabilising agents are sodium citrate, sodium acetate, sodium tartrate, sodium carbonate or combinations thereof. Other salts of citrate, acetate, tartrate and carbonate can also be used. Other α-hydroxy carboxylic acids having stabilising qualities, in addition to citric acid, and tartaric acid, include lactic acid, glycolic acid and hydroxy succinic acid. These α-hydroxy acids are added in a quantity of up to one half equivalent, although a smaller quantity, also exhibits good stabilising effects. For example, an extremely good stabilising effect is obtained with 0.08 mole citric acid per mole aluminium.

The resultant 5 to 7%-solutions, can be diluted down to a concentration of 2% calculated as aluminium. Lower concentrations reduce the stability of the solutions excessively, even when a stabiliser is added, and should therefore be avoided.

As beforementioned, the 5 to 7%-solutions, produced in accordance with the aforegoing are unstable in the absence of stabilisers, due to the prevailing states of equilibrium, conversion to water-insoluble, aluminium compounds taking place, as beforementioned. The conversion rate is dependent upon temperature, this rate increasing with increasing temperature.

Despite this, however, it is possible to vapourise the solution to form a stable, solid, dry product, which is soluble in water and which will provide solutions having properties which are comparable with the properties of the original solution. Although the stability of the solution obtained when re-dissolving the solid product may be impaired, the stability of the solution is quite sufficient for practical, technical use, for example for use in the manufacture of paper.

When vapourising the solution, the temperature shuld not exceed 70° C., and the vapourising time should be restricted as far as possible, by suitable selection of a vapourising means, such as a thin-film evaporator, with good air ventilation. Such an evaporator produces a brittle cake, which disintegrates into an X-ray amorphous product. The products produced in accordance with the invention possess good properties with respect to neutralising the charges in colloidal systems, which results in good coagulation and rapid flocculation in water-purifying processes, and good retention in papermaking processes. Since the product is poor in sulphate, it can be used to advantage in papermaking industries having closed white-water systems, to eliminate undesirable accumulation of sulphate ions. Excessively high quantities of sulphate ions block the desired surface-chemical reactions.

We claim:

1. A method for producing sulphate poor, polynucleate aluminium hydroxide sulphate complexes of the general formula $$[Al(OH)_x(SO_4)_y(H_2O)_z]_n$$

in which n is an integer
x is 1.5 to 2.0
y is 0.5 to 0.75
x+2y is 3
z is greater than 4 which comprises:
neutralising a solution consisting essentially of an aluminium salt of a strong acid to a pH of 5 to 7 with an alkali hydroxide to precipitate amorphous aluminium hydroxide,
separating the precipitated amorphous aluminium hydroxide from the solution, and
reacting the precipitated aluminium hydroxide while it is still in an amorphous form with aluminium sulphate, sulphuric acid or a mixture thereof in an amount such that y is 0.5 to 1.12 under conditions effective to form the polynucleate complexes in solution.

2. A method for producing sulphate poor, polynucleate aluminium hydroxide sulphate complexes of the general formula $$[Al(OH)_x(SO_4)_y(H_2O)_z]_n$$

in which n is an integer
x is 1.5 to 2.0
y is 0.5 to 0.75
x+2y is 3
z is 1.5 to 4 which method includes the steps of:
neutralizing a solution of an aluminium salt of a strong acid to a pH of 5 to 7 with an alkali-metal hydroxide to precipitate amorphous aluminium hydroxide,
separating the precipitated amorphous aluminium hydroxide from the solution,
reacting the precipitated aluminium hydroxide while it is still in an amorphous form with aluminium sulphate, sulphuric acid or a mixture thereof in an amount such that y is 0.5 to 0.75 under conditions effective to form the polynucleate complexes and thereafter separating said polynucleate complex in which z is 1.5 to 4.

3. The method of claims 1 or 2, wherein the aluminium salt is selected from the group consisting of aluminium sulphate, aluminium chloride and aluminium nitrate.

4. The method of claims 1 or 2, wherein the concentration of the aluminium in said aluminium salt solution is at most 5% calculated as Al.

5. The method of claims 1 or 2, wherein the neutralization is carried out at a temperature of 20° to 90° C.

6. The method of claims 1 or 2 which further comprises evaporating water from the solution of aluminium hydroxide treated with sulphate ions until said solution reaches a concentration of 10% aluminium calculated as Al.

7. The method of claims 1 or 2, which further comprises reacting the precipitated amorphous aluminium hydroxide with a stabilizing agent selected from the group consisting of citric acid, acetic acid, hydroxyl heptanoic acid, hydroxyl succinic acid, tartaric acid, lactic acid, glycolic acid, their salts and carbonates.

* * * * *